3,134,717
ANTIBIOTIC COMPOSITIONS

James Miller Smith, Jr. Ridgewood, N.J., assignor to American Cyanamid Company, New York, N.Y., a corporation of Maine
No Drawing. Filed Mar. 29, 1962, Ser. No. 183,408
12 Claims. (Cl. 167—65)

This invention relates to novel antibiotic compositions and more particularly is concerned with the preparation of novel antibiotic compositions containing a tetracycline antibiotic and a potentiating agent therefor whereby effective blood levels of the antibiotic are obtained more rapidly, reach a higher level and are maintained over a longer period of time than would be expected following oral administration of a tetracycline antibiotic without the potentiating agent.

The use of potentiating agents or adjuvants for the purpose of enhancing the blood levels of orally administered tetracycline antibiotics has come into wide-spread use in recent years. Citric acid has proven to be one of the best adjuvants for increasing the rate of absorption and for enhancing serum levels of orally administered tetracycline.

In accordance with the present invention it has now been discovered that 2,2'-phosphinicodilactic acid dilower alkanoates of the following general formula:

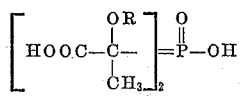

wherein R is lower alkanoyl from 1 to 4 carbon atoms, are highly useful for increasing the blood levels in terms of tetracycline equivalents.

The tetracycline antibotics which may be administered orally in admixture with the novel adjuvants of this invention include the known biologically active tetracyclines, among which may be mentioned tetracycline, chlortetracycline, oxytetracycline,
6-demethylchlortetracycline,
6-demethyltetracycline,
6-deoxytetracycline,
6-demethyl-6-deoxytetracycline,
7-bromo-6-demethyl-6-deoxytetracycline,
7-chloro-6-demethyl-6-deoxytetracycline,
7-iodo-6-demethyl-6-deoxytetracycline.
7-nitro-6-demethyl-6-deoxytetracycline,
9-nitro-6-demethyl-6-deoxytetracycline,
7-bromo-6-deoxytetracycline,
7-iodo-6-deoxytetracycline,
9-nitro-6-deoxytetracycline,
7-nitro-6-deoxytetracycline,
7-amino-6-demethyl-6-deoxytetracycline,
9-amino-6-demethyl-6-deoxytetracycline,
9-amino-6-deoxytetracycline,
9-amino-7-bromo-6-deoxytetracycline,
9-amino-7-nitro-6-deoxytetracycline,
7-iodo-5-hydroxy-6-deoxytetracycline,
7-bromo-5-hydroxy-6-deoxytetracycline,
5-hydroxy-6-deoxytetracycline,
7-bromo-9-nitro-6-demethyl-6-deoxytetracycline,
9-amino-7-chloro-6-demethyl-6-deoxytetracycline,
7-chloro-9-nitro-6-demethyl-6-deoxytetracycline, etc.

The expression "tretracycline antibiotic" as used throughout the specification and claims is intended to embrace any of the foregoing tetracycline compounds. It is to be understood that those tetracyclines which are commercial or potentially commercial products such as chlortetracycline, tetracycline, oxytetracycline, 6-demethylchlortetracycline and 6-demethyltetracycline are especially preferred because of their ready availability and demonstrated utility.

The tetracyclines may be used in the form of their free bases or in the more preferred form of administration as a salt thereof, particularly the hydrochloride salt.

The proportion of the tetracycline antibiotic to adjuvant may vary over a fairly wide range. The adjuvant is preferably used in an amount ranging from about 1 to 3 parts by weight of the tetracycline antibiotic. As the adjuvant is much cheaper than the tetracycline antibiotic, it is preferred to operate with an excess of adjuvant and optimum results will usually be obtained with an amounut of adjuvant ranging from equal amounts to three times the weight of the tetracycline antibiotic.

The utility of the compositions of the present invention is demonstrated by the action of these compositions in enhancing the blood levels, in terms of tetracycline equivalents, in laboratory animals such as the rat which is commonly used for this purpose. In carrying out this test procedure the rats are dosed with one of the novel compositions of this invention, and four hours after dosing, the blood is drawn and the serum levels of the antibiotic in the blood are measured in terms of tetracycline equivalents. A similar group of rats are administered tetracycline without the adjuvant and are used as the control.

The invention will be described in greater detail in conjunction with the following specific examples in which the parts are by weight unless otherwise specified.

EXAMPLE 1

A 30-part sample of 2,2'-phosphinicodilactic acid was added in portions over a 15 minute period to 162 parts of acetic anhydride while the temperature was kept below 35° C. The reaction mixture was maintained at room temperature for 17 hours and this mixture then heated to and maintained at 80° to 85° C. for one hour. The mixture was cooled to 5° C. and the solid which formed was filtered off and washed with 25 parts of chloroform. The yield of crude material was 54% of theory.

A 20-part portion of the crude diacetyl derivative was purified by recrystallization from 200 parts of glacial acetic acid. The purified sample melted at 147° C. to 148° C. with decomposition and gave the correct analytical values for 2,2'-phosphinicodilactic acid diacetate.

In a similar manner other lower alkanoates may be prepared by using other lower alkanoyl anhydrides such as propionic anhydride, butyric anhydride and the like.

EXAMPLE 2

A group of three albino rats ranging from 175–300 grams were dosed with a solution or suspension of 50 m./kg. of tetracycline hydrochloride via a feeding needle. A similar group of three rats received a mixture of 50 mg./kg. of tetracycline hydrochloride plus 50 mg./kg. of 2,2'-phosphinicodilactic acid diacetate. The blood levels were determined four hours after dosing. The results obtained are shown in the table below:

Table 1

| Substance | Dose, mg./kg. | Serum Levels, mcg./ml. |
|---|---|---|
| Tetracycline HCl | 50 | 5.99 |
| Tetracycline HCl plus 2,2'-phosphinicodilactic acid diacetate | 50 | 7.96 |

EXAMPLE 3

Groups of five albino rats ranging from 175–300 grams were dosed with a solution or suspension of 50 mg./kg. of 6-demethyltetracycline hydrochloric via a feeding needle. A similar group of five rats received a mixture of 50 mg./kg. of 6-demethyltetracycline hydrochloride plus 50 mg./kg. of 2,2'-phosphinicodilactic acid acetate. The serum levels were determined four hours after administration.

Results similar to those in Example 2 were obtained. An increased blood level of the tetracycline was observed in those animals receiving 2,2′-phosphinicodilactic acid acetate plus the tetracycline as compared with those receiving the tetracycline alone.

EXAMPLE 4

Groups of five albino rats ranging from 175–300 grams were dosed with a solution or suspension of 50 mg./kg. of 6-demethylchlortetracycline hydrochloride via a feeding needle. A similar group of five rats received a mixture of 50 mg./kg. of 6-demethylchlortetracycline hydrochloride plus 50 mg./kg. of 2,2′-phosphinicodilactic acid diacetate. The serum levels were determined four hours after administration.

Results similar to those in Example 2 were obtained. An increased blood level of the tetracycline was observed in those animals receiving 2,2′-phosphinicodilactic acid acetate plus the tetracycline as compared with those receiving the tetracycline alone.

I claim:

1. A composition of matter comprising a tetracycline antibiotic and from 1 to 3 parts by weight of a compound of the formula:

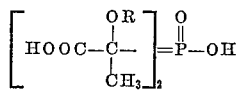

wherein R is lower alkanoyl from 1 to 4 carbon atoms as an oral potentiating agent therefor.

2. A composition according to claim 1 in which the antibiotic is chlortetracycline.

3. A composition according to claim 1 in which the antibiotic is tetracycline.

4. A composition according to claim 1 in which the antibiotic is oxytetracycline.

5. A composition according to claim 1 in which the antibiotic is 6-demethylchlortetracycline.

6. A composition according to claim 1 in which the antibiotic is 6-demethyltetracycline.

7. A method of increasing the absorption of a tetracycline antibiotic when administered orally which comprises the step of administering therewith from 1 to 3 parts by weight of a compound of the formula:

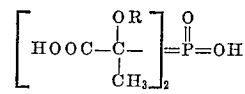

wherein R is lower alkanoyl from 1 to 4 carbon atoms.

8. A method according to claim 7 in which the antibiotic is chlortetracycline.

9. A method according to claim 7 in which the antibiotic is tetracycline.

10. A method according to claim 7 in which the antibiotic is oxytetracycline.

11. A method according to claim 7 in which the antibiotic is 6-demethylchlortetracycline.

12. A method according to claim 7 in which the antibiotic is 6-demethyltetracycline.

References Cited in the file of this patent

Boger et al.: "An Evaluation of Tetracycline Preparations," New England Journal of Medicine, vol. 261, No. 17, pp. 827–832, Oct. 22, 1959.

Kunin et al.: "Excretion of Demethylchlortetracycline Into the Bile," New England Journal of Medicine, vol. 261 No. 21, pp. 1069–1071, Nov. 19, 1959.

American Cyanamid Australia Abridgement #62, 152/60, published Jan. 12, 1961.